L. BURG.
NUT LOCK.
APPLICATION FILED FEB. 6, 1908.
No. 898,719.
Patented Sept. 15, 1908.
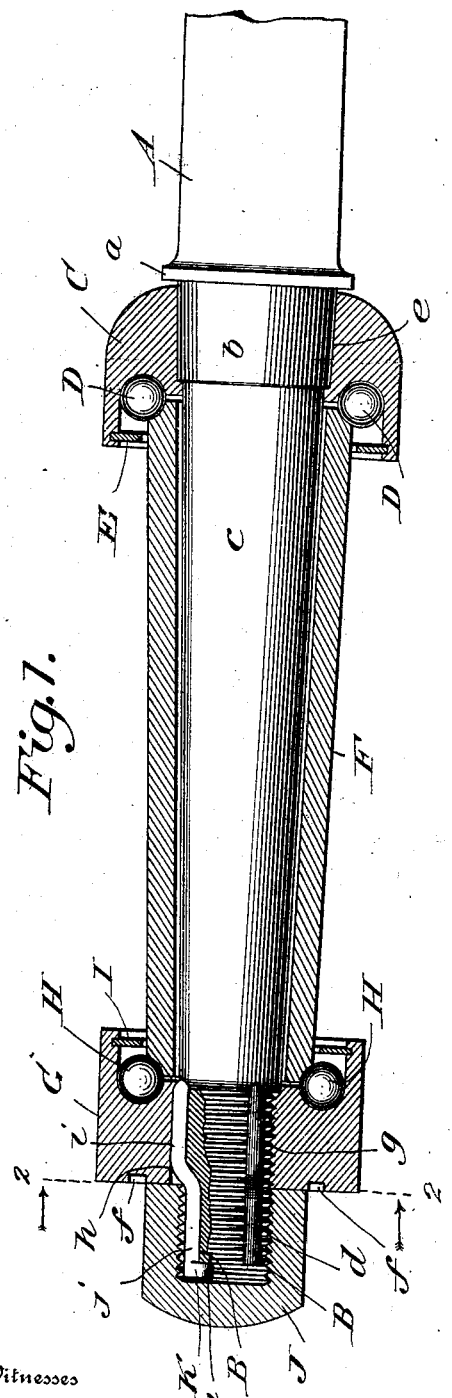
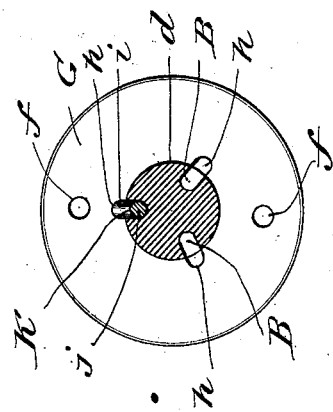
Witnesses
Inventor
Louis Burg
James J. Sheehy
Attorney

UNITED STATES PATENT OFFICE.

LOUIS BURG, OF DALLAS CITY, ILLINOIS.

NUT-LOCK.

No. 898,719.   Specification of Letters Patent.   Patented Sept. 15, 1908.

Application filed February 6, 1908. Serial No. 414,628.

*To all whom it may concern:*

Be it known that I, LOUIS BURG, citizen of the United States, residing at Dallas City, in the county of Hancock and State of Illinois, have invented new and useful Improvements in Nut-Locks, of which the following is a specification.

My invention has to do with nut locks, and its object is the provision of a peculiar and advantageous nut lock designed especially for the purpose of locking in place a ball bearing cup such as employed on axle spindles.

With the foregoing in mind the nature of the invention and its novelty, utility and practical advantages will be fully understood from the following description and claims when the same are read in connection with the drawings, accompanying and forming part of this specification, in which:

Figure 1 is a view, partly in elevation and partly in section, illustrating a ball bearing constituting the best practical embodiment of my invention known to me. Fig. 2 is a transverse section taken in the plane indicated by the line 2—2 of Fig. 1, looking in the direction indicated by the arrows.

Referring by letter to the said drawings, A is the axle of my novel bearing. The said axle is preferably provided with a collar $a$ and a spindle comprising a comparatively short inner tapered portion $b$ and a comparatively long outer tapered portion $c$. I would have it understood, however, that the said spindle may be of any other type compatible with the purpose of my present invention without involving departure from the scope of the invention as defined in the claims appended. At its outer end the spindle portion $c$ terminates in a threaded portion $d$, and in the said threaded portion $d$ three (more or less) longitudinally disposed grooves, B are formed. Each of the said grooves B comprises an inner portion which is comparatively shallow and an outer portion of about twice the depth of the inner portion, Fig. 1, and I prefer in practice that the said inner and outer portions of the grooves be of the approximate proportional lengths illustrated in Fig. 1.

C is a ball cup having a taper bore $e$ receiving the spindle portion $b$. D D are anti-friction balls disposed in the said cup.

E is a ball-retaining ring carried by the cup.

F is the axle box of the bearing, and G is an outer ball cup containing anti-friction balls H and a ball-retaining ring I. The said outer ball cup is preferably, though not necessarily, of circular form and is therefore provided in its outer face with depressions $f$ for the engagement of a spanner wrench or the like. Interiorly the cup G is threaded as indicated by $g$ and is provided with three (more or less) grooves $h$ which are disposed longitudinally of the bearing and intersect the thread $g$ as illustrated.

J is the nut of the bearing which is preferably of the cap type and is designed to be turned up against and to frictionally engage the outer face of the cup G, as shown in Fig. 1.

By virtue of the construction described, it will be manifest that when the cup G is correctly positioned on the spindle, and a key K, of the shape shown is placed in opposed and registered grooves of the spindle and cup, the cup will be effectually prevented from casually turning on the spindle, and hence there will be no liability of the cup shifting its position and locking the box F or unduly crowding the balls H against the same. It will also be manifest that the locking of the cup to the spindle is effected by the inner portion $i$ of the key, and that because of the outer portion $j$ of the key being arranged in a plane parallel to that of the inner portion and also because of the outer portions of the grooves in the spindle being deeper than the inner portions of said grooves, clearance for the nut J is afforded—*i. e.*, the outer portion $j$ of the key is positioned relative to the spindle and nut in such manner as not to interfere with turning of the latter on and off the former. At its outer end the key K is provided with a head $m$, and when the key is introduced to lock the cup G to the spindle, said head bears against the outer end of the spindle and affords means by which the key may be grasped and readily withdrawn. It will also be noted at this point that the head $m$ of the key serves to limit inward movement of the key, and that the nut J serves to effectually prevent casual outward movement of the key, while the frictional contact between the opposed surfaces of the cup G and the nut J reduces to a minimum the liability of casual turning of the said nut. At this point I would have it understood that in practice I prefer to thread the ends of spindles for use on the right hand sides of vehicles toward the right and the ends of spindles for use on the left hand sides of vehicles toward the left, so that the liability of casual loosening of the nuts J will be further reduced. I also prefer to thread the spindle in the manner shown since this contributes to the facility with which the spindle may be produced.

The peculiar shaped grooves in the spindle and the peculiar shaped key K of my improvements are materially advantageous for the reason that the portion of the spindle on which the cup G is located is not materially weakened and at the same time the necessity of grooving and consequently weakening the nut J is obviated.

As before stated, the construction herein illustrated and described constitutes the best practical embodiment of my invention of which I am aware, but I would have it understood that in the future practice of the invention such changes in the form, construction and relative arrangement of parts may be made as fairly fall within the scope of my invention as defined in the claims appended.

Having described my invention, what I claim and desire to secure by Letters-Patent, is:

1. In a nut lock for ball bearing cups, the combination of a spindle having a longitudinally grooved and threaded end portion; the outer portions of the said grooves being deeper than the inner portions thereof, a ball cup interiorly threaded to receive the threaded portion of the spindle and interiorly grooved, a key having inner and outer portions disposed in different planes; the said key being removably arranged in registered grooves of the spindle and cup, and a nut removably arranged on the threaded portion of the spindle.

2. In a nut lock for ball bearing cups, the combination of a spindle having a longitudinally grooved and threaded end portion; the outer portions of the said grooves being deeper than the inner portions thereof, a ball cup interiorly threaded to receive the threaded portion of the spindle and interiorly grooved, a key having inner and outer portions disposed in different planes and also having a head at its outer end; said key being removably arranged in registered grooves of the spindle and cup, and a cap nut arranged on the threaded portion of the spindle.

In testimony whereof I have hereunto set my hand in presence of two subscribing witnesses.

LOUIS BURG.

Witnesses:
C. H. KISTNER,
O. MCANDREW.